MAIN MEMORY GATE DECODE

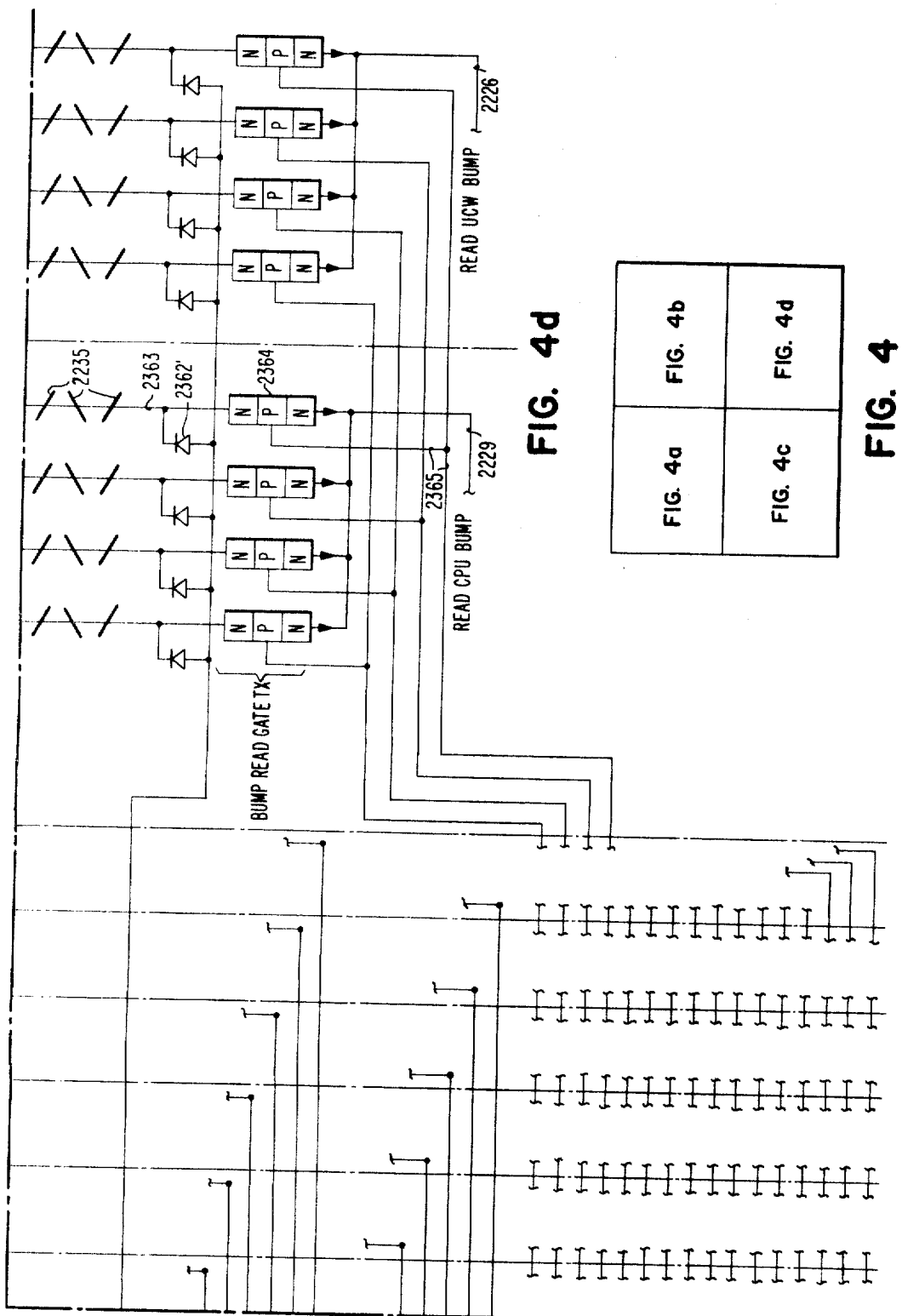

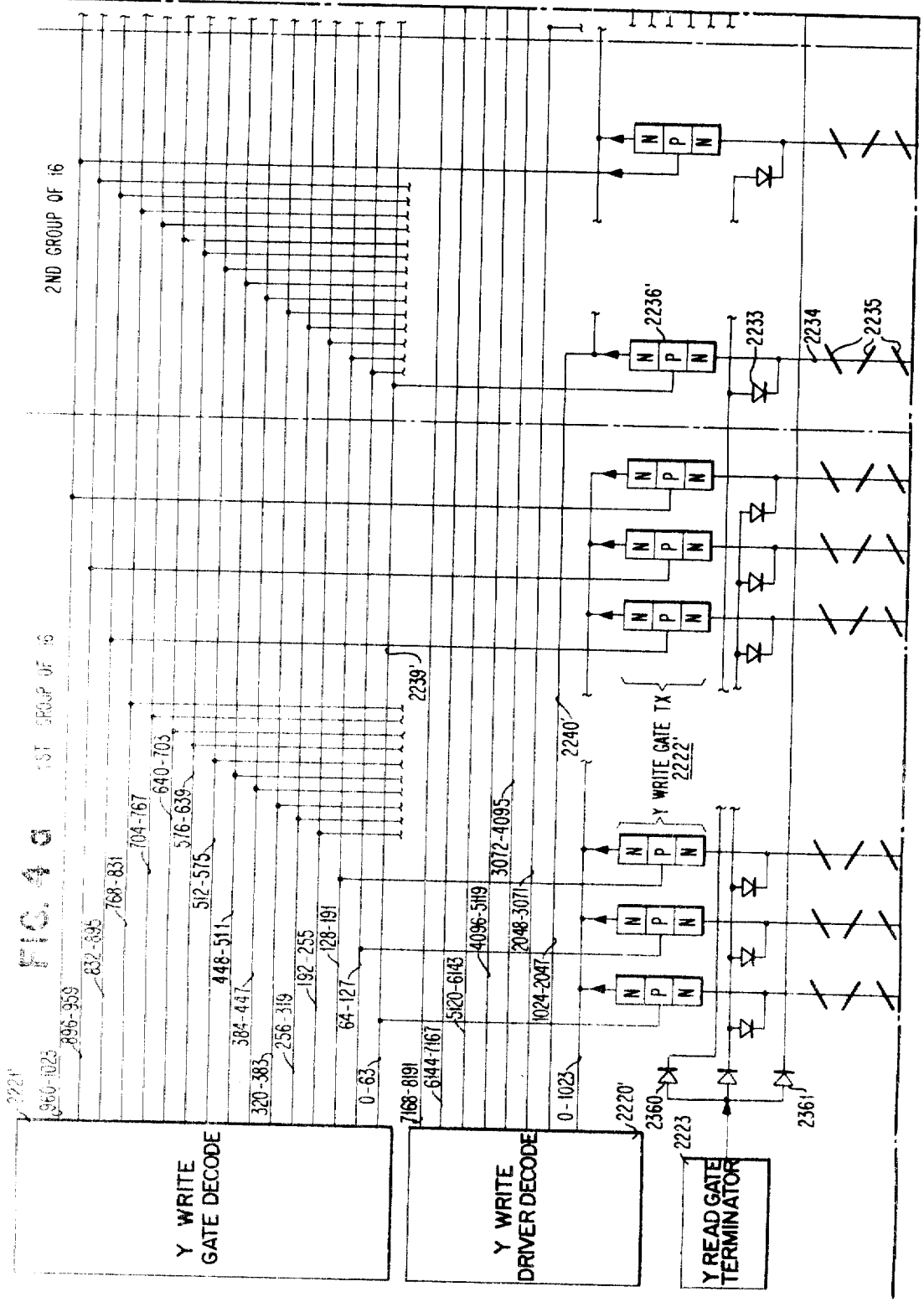

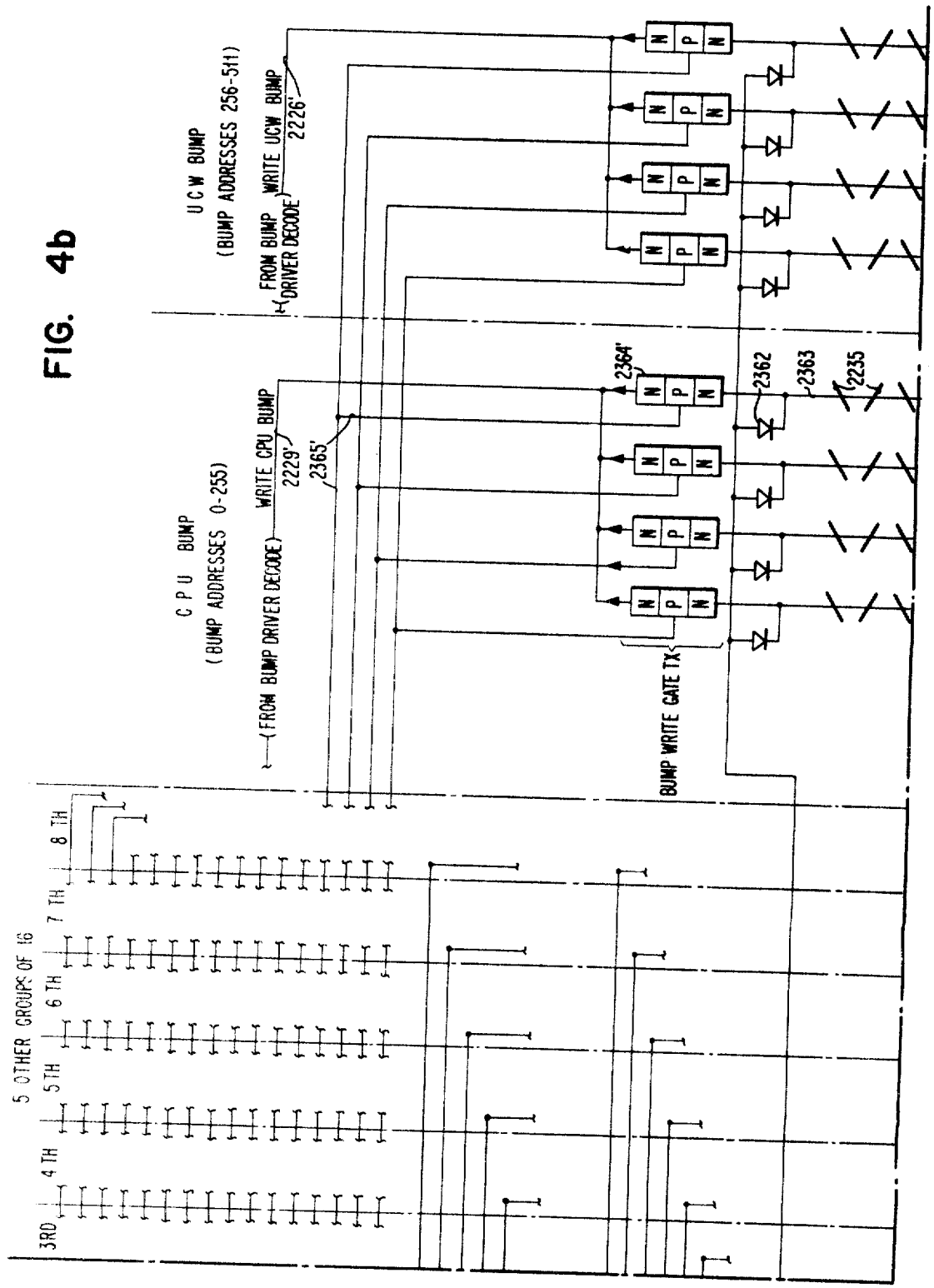

United States Patent Office 3,317,902
Patented May 2, 1967

---

3,317,902
ADDRESS SELECTION CONTROL APPARATUS
Louis A. Michael, Vestal, N.Y., assignor to International Business Machines Corporation, New York, N.Y., a corporation of New York
Filed Apr. 6, 1964, Ser. No. 357,359
6 Claims. (Cl. 340—172.5)

This invention relates to address selection control apparatus for data processing systems, and relates more particularly to such apparatus for selectively, and with a minimum of decode circuitry, addressing a selectable address in one of a plurality of data storage areas of unequal storage capacity.

It has been proposed to provide a data processing system having a main memory unit comprising a main storage area and a so-called "bump" storage area. The main storage area may, for sake of illustration, have 8,192 addresses of conventional storage. The bump storage area may have, for example, 512 addresses that provide increased address capacity to take the place of considerable hardware that otherwise would have to be separately included as part of a central processing unit; e.g., index registers, base address registers, floating point working registers, accumulators, and other devices for storage of control words, special purpose characters, or the like. Obviously, the main and bump areas could be addressed by separate decode circuitry, with the bump area being essentially a totally independent ancillary smaller memory unit. However, for reasons of economy and compactness, it would be preferable to provide a decode arrangement wherein at least certain portions of the decode circuitry can be conditioned to serve selectively during addressing of either the main storage area or the bump storage area. To select one of the 8192 main area addresses of course requires an address register means having a much larger number of data-containing bit positions than is necessary to address one of the 512 addresses in the bump area.

The invention can best be understood by an illustration. Assume that four address register bit positions are used to provide any one of sixteen possible binary outputs to control energization of a corresponding drive line of one group controlling selection within one dimension of the main area address; and assume further that only two of these same four bit positions are needed to provide any one of four possible binary outputs to control energization of a corresponding drive line of an entirely different group controlling selection within the equivalent dimension of a bump area address. Under such circumstances, in order positively to assure against incorrect addressing it will be necessary to nullify or render ineffective any data stored in those (two) bit positions not actually needed to select the desired bump address.

Accordingly, it is one object of this invention to provide an improved, compact, relatively inexpensive apparatus for selectively addressing a selectable address in one of a plurality of data storage areas having unequal numbers of addresses and hence of drive lines controlling selection of said addresses, and wherein certain common decode circuitry serves during selective addressing of any one of said areas.

Another object of this invention is to provide an improved address selection control apparatus of the above general type embodying means, effective during addressing of a small-capacity storage area, to nullify or render ineffective potentially invalid data that may then be present in all those address register bit positions not actually needed for the selection of the address in said smaller storage area, thereby to positively assure against incorrect selection of the address in said smaller area.

Still another object is to provide an address selection control apparatus for selectively addressing one of a plurality of storage areas of different storage capacity, wherein a signal having a level corresponding to the particular storage area being addressed conditions the decode circuitry, during addressing of a small capacity storage area, to select a unique output from a small group of possible outputs, rather than from the larger group of possible outputs available during addressing of the larger capacity storage area.

According to these objects, there is provided an improved apparatus for selectively addressing a selectable data-containing address in one or the other of two data storage areas having different numbers of addresses and hence requiring different numbers of address-decoding drive lines for address selection. A common address register means has a predetermined number of bit positions containing binary coded data or indicia sufficient to select and energize an appropriate one of the large number of drive lines of the larger storage area. Some of these bit positions are used to store binary coded data for controlling energization of an appropriate one of a lesser number of drive lines contained in an entirely different group and controlling address selection in the smaller storage area. A signal is provided having a level denoting which of the particular storage areas is to be addressed. When the smaller storage area is to be addressed, this signal modifies operation of a common decode means for both storage areas, to cause said decode means to select one of the lesser number of drive lines for the smaller storage area according to the data contained in only some of the predetermined bit positions of the address register means irrespective of what data the remaining bit positions may contain.

The foregoing and other objects, features and advantages of the invention will be apparent from the following more particular description of preferred embodiments of the invention, as illustrated in the accompanying drawings, wherein.

Figure 5:
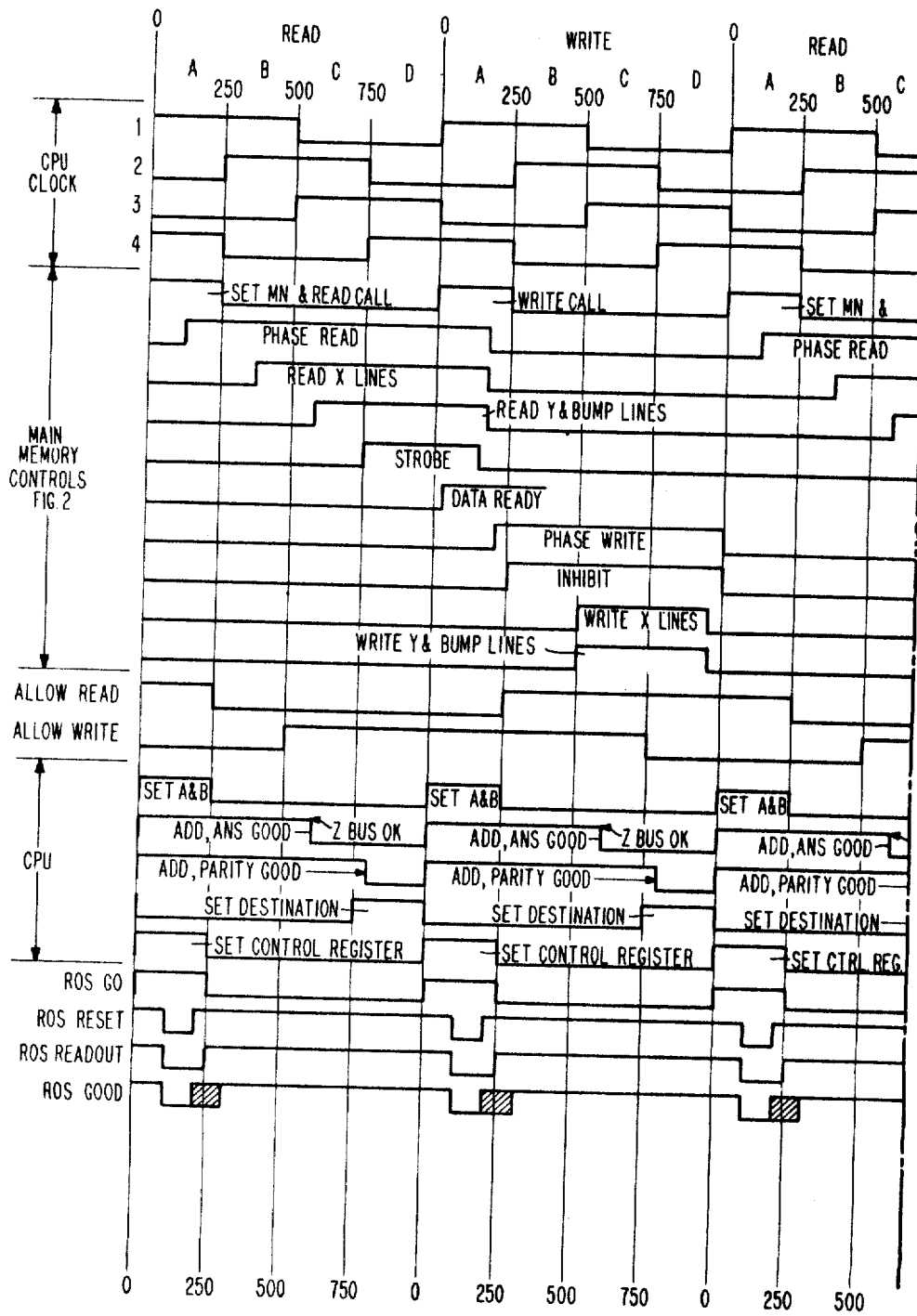
Figure 6:
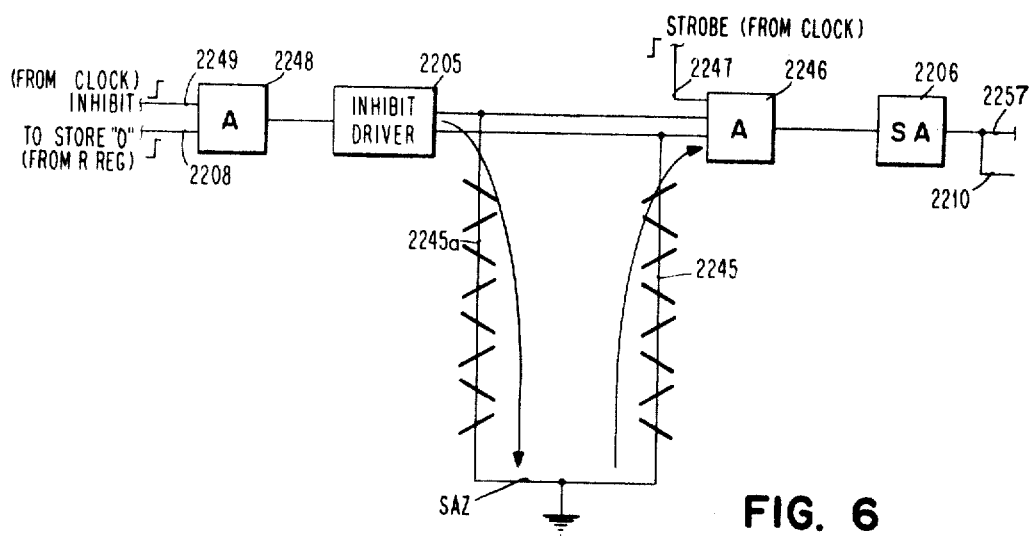
Figure 7:
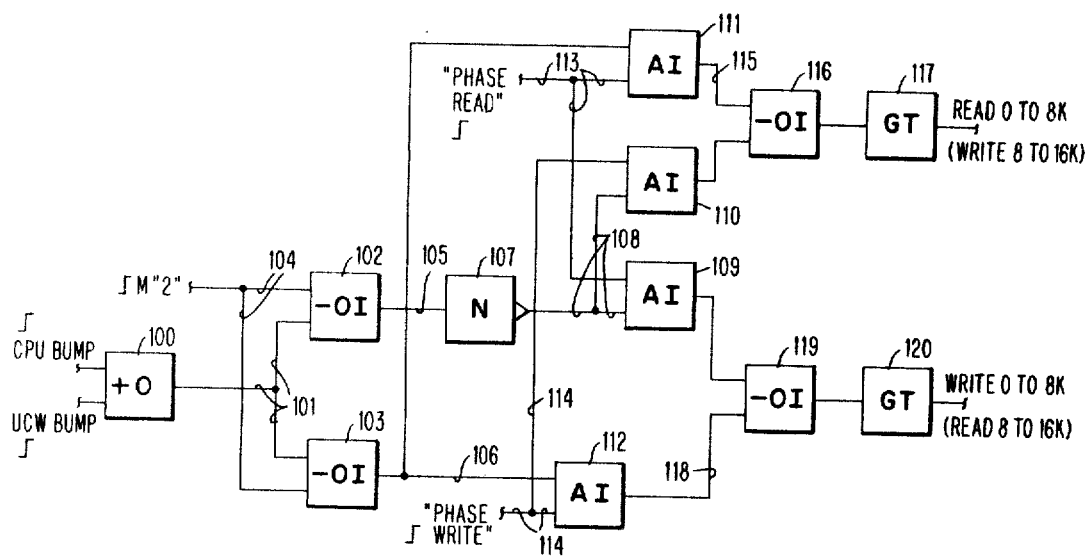

FIG. 4, a composite of 4a through 4d, which taken together, constitute a diagrammatic showing of the circuitry for selecting any desired address in any of the storage areas;

FIG. 5 is a timing diagram;

FIG. 6 is a diagrammatic showing of a common inhibit-sense system used in the address selection control apparatus; and FIG. 7 is a diagrammatic showing of another application of the invention.

Description

Initially, it is to be noted that the address selection control aparatus described and claimed herein has been disclosed (but not claimed) in the copending application of Gene M. Amdahl et al., entitled "Data Processing System," U.S. Ser. No. 357,372, filed concurrently herewith. The reference numerals in the instant application, while generally consecutive, are of an unusual order of magnitude because the same reference numerals have been employed to designate structure in this application which is identical to that disclosed in the Amdahl et al. application. However, if reference to the latter is desired as illustrative of a complete data processing system in which the control apparatus of the invention may be employed, it will help the reader to note that the drawings have been renumbered, such that FIGS. 1 through 6 of this application correspond, respectively, to FIGS. 54, 55, 55A, 56a through 56d, 38a and 62 of the Amdahl et al. application. However, it is submitted that access to and/or reference to the Amdahl et al. application is absolutely *not* essential to a full understanding of the present invention.

Figure 1:
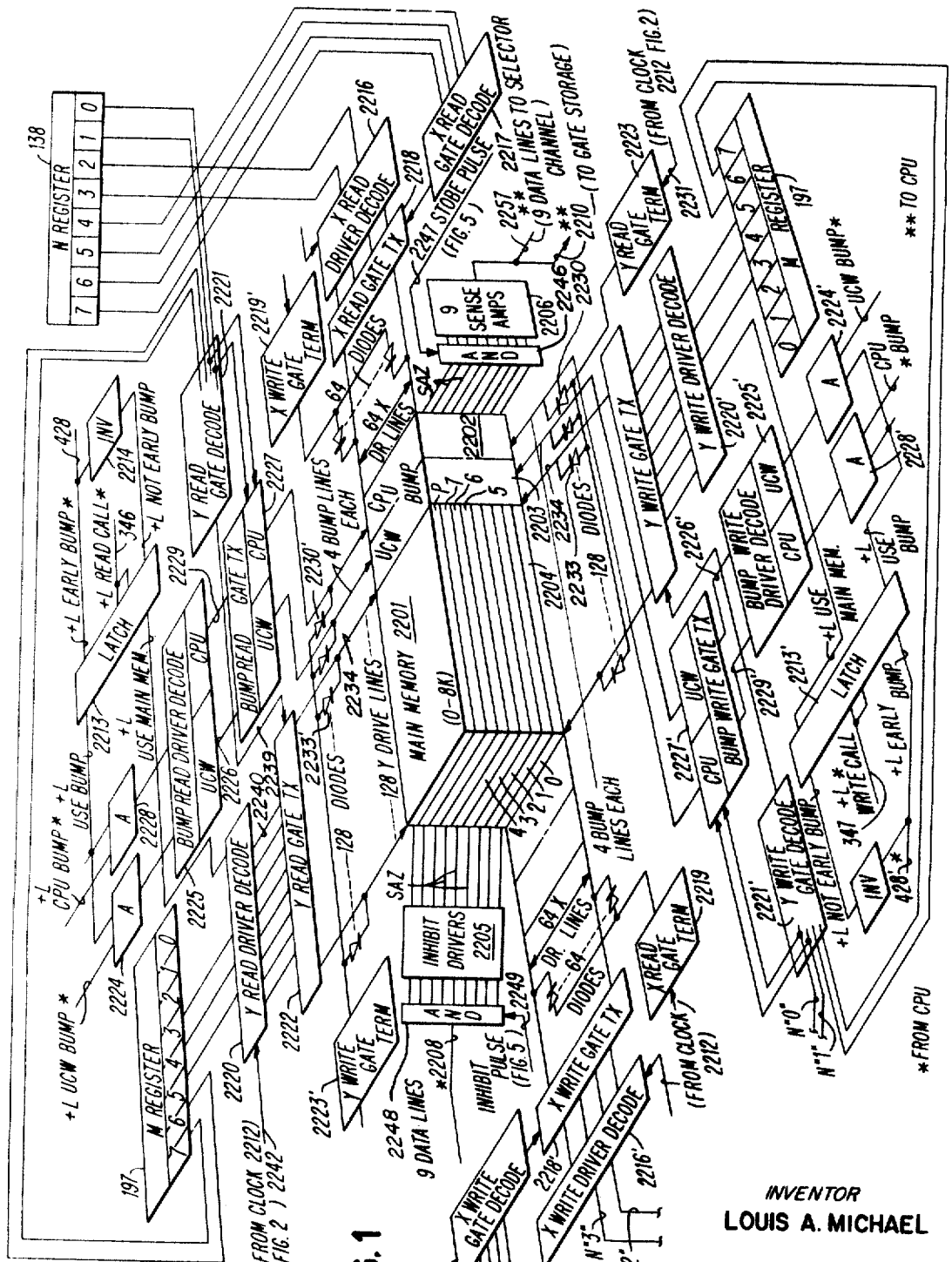
FIG. 1 is a diagrammatic representation, laid out in perspective, of an address selection control apparatus embodying the invention, shown associated with a memory unit having data storage areas of unequal storage capacity.

As shown in FIG. 1, a main memory unit 2201 comprises a CPU bump storage area 2202, a unit control word (UCW) bump storage area 2203, a main storage area 2204, an inhibit section 2205 and a sense amplifier section 2206.

As illustrated, the main memory unit 2201, comprises nine core planes arranged in a stack to provide a 9-bit character represented by planes 0 to 7 and a parity plane P adjacent plane 7.

Each core plane comprises a matrix array of cores having substantially square hysteresis loop characteristics. Sixty-four X drive lines pass through respective rows of cores; and passing through the respective columns of the cores are 128 Y drive lines for main storage area 2204 and eight bump drive lines (four for each area 2202 and 2203). Thus, the main area 2204 provided 8192 (i.e., 64×128) addresses 0 to 8191; the 64×4 CPU bump area 2202 provides bump area addresses 0–255; and the 64×4 UCW bump area 2203 provides bump area addresses 256 to 511. Unique selection of all nine cores at any selected main or bump address is effected by coincident half-select X and Y (or bump) drive currents.

A desired main area or bump area address is selected by binary coded data stored in predetermined bit positions of an address register means. As illustrated, the address register means comprises M and N register 197, 138, repectively. FIG. 1 shows the particular data bit position outputs of these registers that are connected to an X read driver decode until 2216 and an X read gate decode unit 2217. As will be explained presently in greater detail, these units 2216 and 2217 provide unique selection of any one of 64 (four groups of 16) X drive lines by a corresponding unique one of 64 circuits in a X read gate transistor unit 2218. The source of current of proper polarity for read is provided by an X read gate terminator unit 2219.

FIG. 1 also shows the M and N register data bit position outputs that are connected to a Y read driver decode unit 2220 and a Y read gate decode unit 2221 to provide unique selection of any one of 128 (eight groups of 16) Y drive lines by a corresponding unique one of 128 circuits of a Y read gate transistor unit 2222. The source of current of proper polarity for read is provided by a Y read gate terminator unit 2223.

To read an address in the main area 2204, a signal must be up in a use main memory line. That up signal is supplied from a conventional bistable trigger or latch 2213 which is set if a Read Call signal is up in line 346 from the CPU while an Early Bump signal is down in line 428 from the CPU; this is because an inverter 2214 will then provide an up signal in a not early bump line.

If, however, an up signal is in early bump line 428 when a Read Call signal comes up in line 346, latch 2213 will be reset, and provide an up signal in a use bump line. To read an address in UCW bump area 2203, an up signal is supplied from the CPU to be UCW bump line. This is ANDed at 2224 with the up signal in the use bump line to activate the UCW section of a bump read driver decode unit 2225. This, in turn, will complete a circuit through a line 2226 leading to a bump read gate transistor unit 2227. On the other hand, to read an address in CPU bump area 2202, signals must be up concurrently in the use bump and CPU bump lines and ANDed at 2228 to activate the CPU section of bump read driver decode unit 2225. This will complete a circuit through a line 2229 leading to the CPU section of the bump read gate transistor unit 2227.

Meanwhile, the N register "0" and "1" address bits will be decoded via a portion of the Y read gate decode unit 2221, and the resultant output will be supplied to the bump read gate transistor unit 2227. As a result, one of the four output lines from either the UCW section or the CPU section of the gate transistor unit 2227 will be uniquely conditioned according to whether line 2226 or 2229 is energized, for causing current to be supplied through one of the total of eight bump drive lines passing in the Y direction through the cores of the bump areas 2203, 2202. Actually, this current is supplied during a read operation from the Y read gate terminator unit 2223 through a unique one of eight diodes indicated generally at 2230, in the manner to be described presently.

The X, Y and bump decode units thus far described control address decoding during READ operations. Identical reference numerals, but primed, have been used to designate the duplicate counterpart structure that provides address decoding during WRITE operations.

Figure 2:
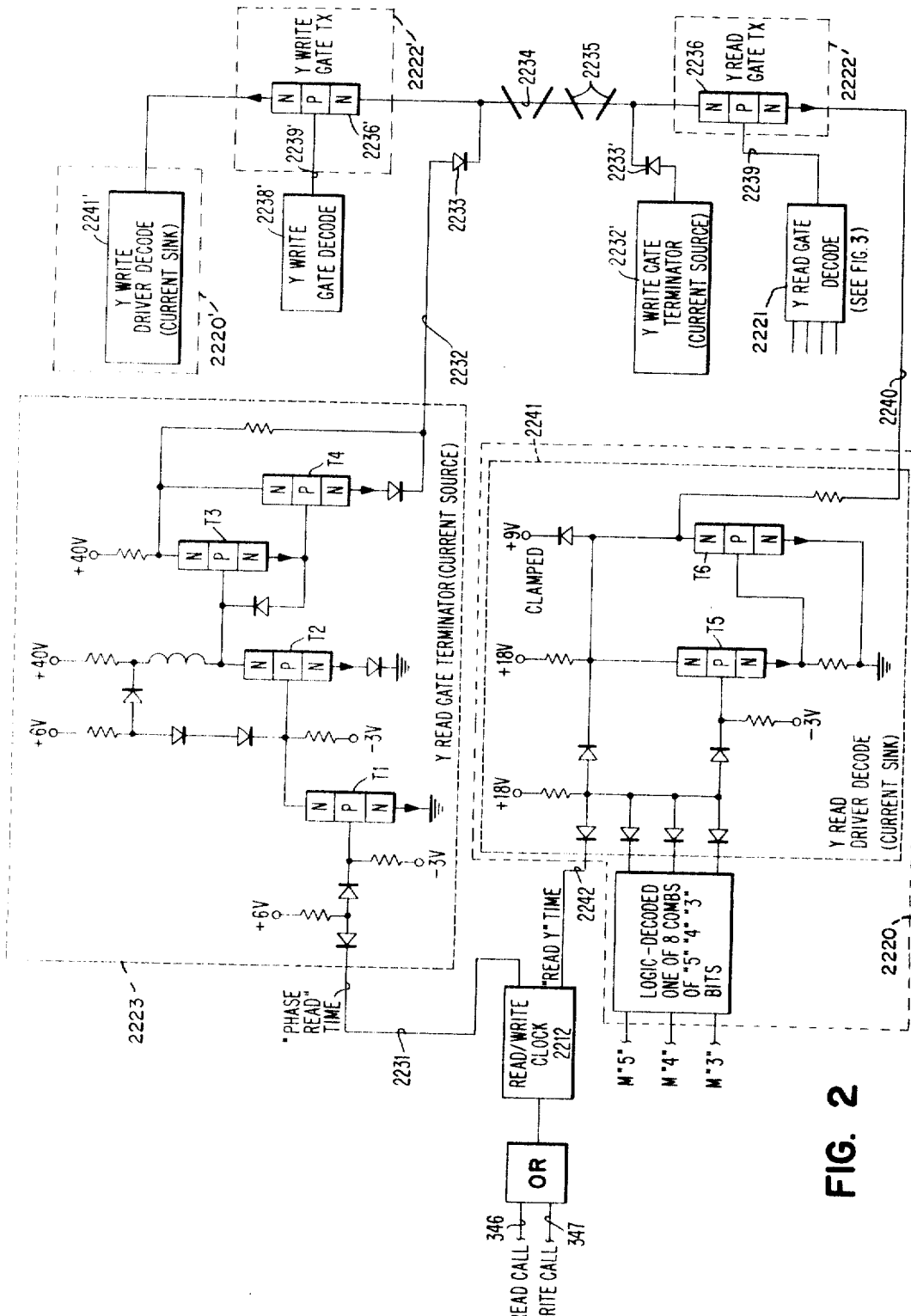
FIG. 2 is a circuit diagram, partly schematic and partly diagrammatic, showing details of certain portions of the basic address decode circuitry.
Figure 3:
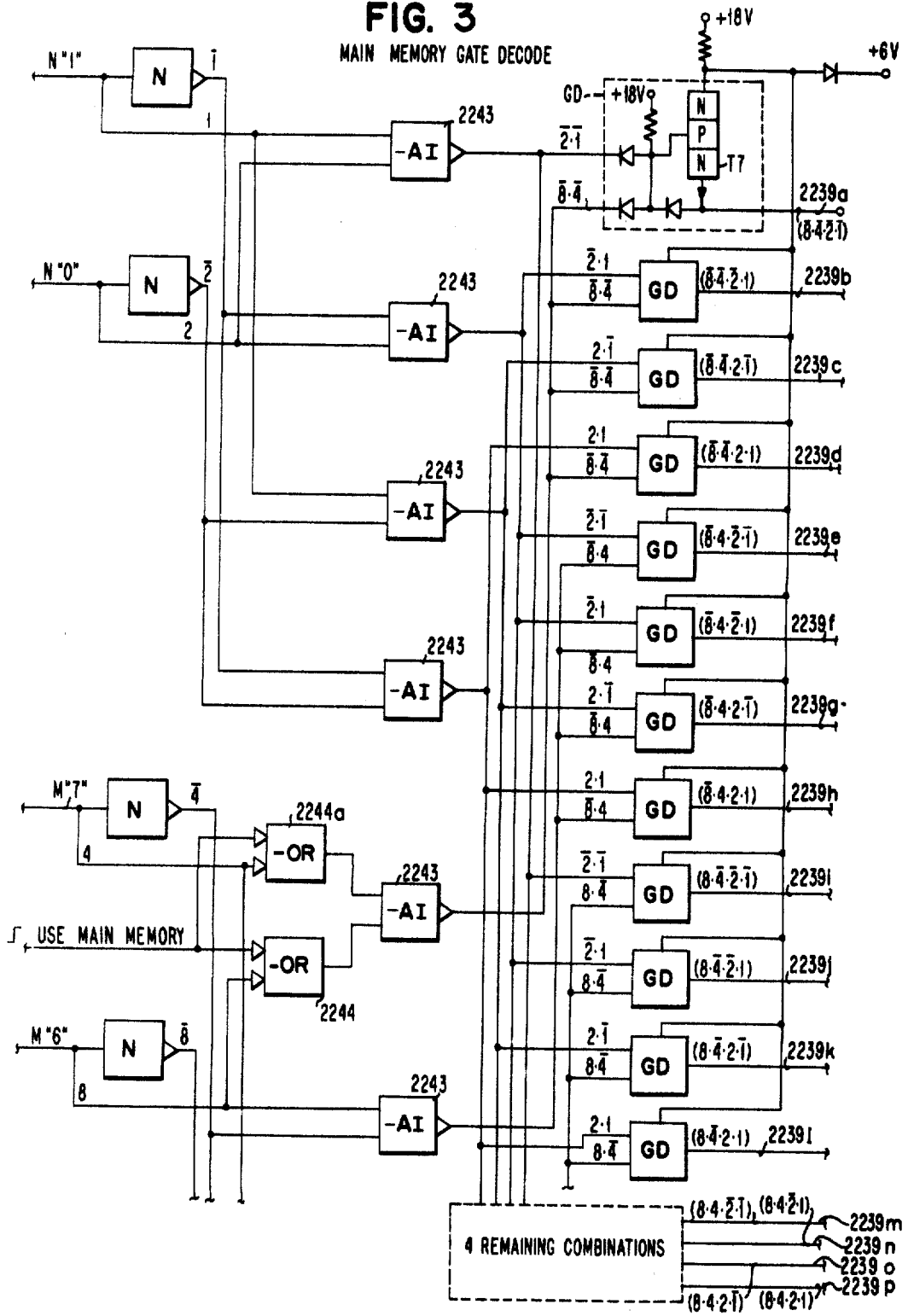
FIG. 3 is a diagrammatic showing of the gate decode circuitry more clearly illustrating the basic concept of the invention.

FIGS. 2, 3 and 4 show more completely how addressing is accomplished during read and write operations. These figures include details of the various decoding circuits. For sake of illustration, only a basic decode circuit for the Y dimension of a main area address is shown in FIG. 2. Referring to this figure, a Read/Write clock 2212 is responsive to a Read Call on line 346 or a Write Call on line 347 from the CPU to supply a pulse to a delay line (not shown). Signals tapped off this delay line provide pulses at desired times as shown in the "Main Memory Controls" portion of the timing diagram of FIG. 5; and these signals provide internal control of timing for all read and write operations.

At "phase read" time (see FIG. 5) an up signal is transmitted via a line 2231 to Y read gate terminator 2223 (FIG. 2). Within the terminator, this will turn transistor T1 on, thereby turning transistor T2 off. This will cause the emitter of transistor T3 to go positive, and turn transistor T4 on to supply current from a +40 v. source via a line 2232 and a unique one of the 128 diodes 2233 to a corresponding unique Y drive line 2234. Line 2234 passes through a column of square-hysteresis-loop-type ferrite cores 2235 to the collector of an appropriate one of the 128 NPN-type Y read gate transistors 2236 forming part of the unit 2222.

Meanwhile, an up-level signal will be delivered (in the manner presently to be described) from a Y read gate decode circuit of unit 2221 within the proper address range via an appropriate line 2239 to the base of the selected transistor 2236 to turn it on to operatively connect the associated drive line 2234 to that corresponding one of the lines 2240 leading from the emitter of selected transistor 2236 to the appropriate Y read driver decode circuit 2241 forming part of unit 2220. This circuit is conditioned to serve as a current sink for the decode circuitry at "Read Y" time (see FIG. 5). At that time the up-level signals provided from a distinctive one of eight binary combinations of data from the bit positions ("5," "4," "3") of M register 197 will be ANDed with the up-level "Read Y" signal provided in a line 2242 by clock 2212, thus turning a transistor T5 on. This will turn a transistor T6 on and complete connection of the selected line 2240 to ground via the emitter of T6.

Note that each of the Y read gate decode circuits of unit 2221 decodes its corresponding address lines as soon as received; i.e., these lines are active until the write cycle is completed, and are not subject to control by the clock 2212. Hence, the N bit positions ("1" and "0") and M bit positions ("7" and "6") will be decoded immediately.

Conversely (and in accordance with the above-mentioned convention of denoting, by a prime, the counterpart structure used during a write operation), current from Y write gate terminator unit 2223' (FIG. 1) is supplied via a unique one of the 128 corresponding unique diodes 2233' and the one of the 128 corresponding unique Y drive line 2234 to the collector of an appropriate one of the 128 NPN-type write gate transistors 2236' of unit 2222'. Meanwhile, a signal from the Y write gate decode unit 2221' within the proper address range is delivered to the base of the selected transistor 2236' to turn it on and thus operatively connect the associated drive line 2234 to the output from an appropriate write driver decode circuit 2241' that serves as a current sink.

According to the invention, and as shown in FIG. 3, the Y read gate decode unit 2221 comprises inverters N to provide the complements of the data stored in the bit positions M"6," M"7," N"0" and N"1." Different groups of two bits and their complements are connected to respective negative AND gates 2243 to provide a first level of decode. Respective gate decoders GD provide second levels of decode, to cause an up-level output in a distinctive one of the sixteen lines 2239a to p corresponding to the binary value of the data actually present in the aforesaid bit positions. For example, an up signal will be provided in line 2239g if the data in M"6," M"7," N"0," N"1" is represented binarily as "01110," which as illustrated corresponds to the "$\bar{8}\cdot 4\cdot 2\cdot \bar{1}$" notation.

More specifically, each gate decoder GD comprises a pair of diodes which are poled to require up-level signals in the outputs of both negative AND gates 2243 of a selected pair in order to enable a transistor T7 to turn on. With T7 on, an up-level signal will be supplied to the corresponding line 2239 to turn the corresponding read gate transistor 2236 on.

To positively assure against selection of an incorrect address within either bump area, the use main memory line and the data bit from M"6" are connected to a negative OR gate 2244; and a branch of the use main memory line and the data bit from M"7" are connected to another negative OR gate 2244a. Thus, while the Use Main Memory signal is up during addressing of the main storage area 2204, said signal has no effect on the gate decode circuit. However, as shown in FIG. 1, when an Early Bump signal comes up in line 428, the Use Bump signal will come up at read call; and the Use Main Memory signal will hence go down. Thus, irrespective of the data present in M"6" and M"7," this Use Main Memory down signal will pass through OR gates 2244, 2244a and be ANDed and inverted at 2243, producing an up signal in a line common to all four addresses having the notation $\bar{8}\cdot\bar{4}$. Thus, the bump address will be decoded only according to the data contained in the N"0" and N"1" bit positions of N register 138; i.e., one of the four bump drive lines for the CPU bump area 2202 or UCW bump area 2203 will be energized (depending on whether the CPU bump or UCW bump signal is then up), thereby to limit decoding to one of the 256 (4×64) valid addresses within the selected bump area.

Figure 4C:
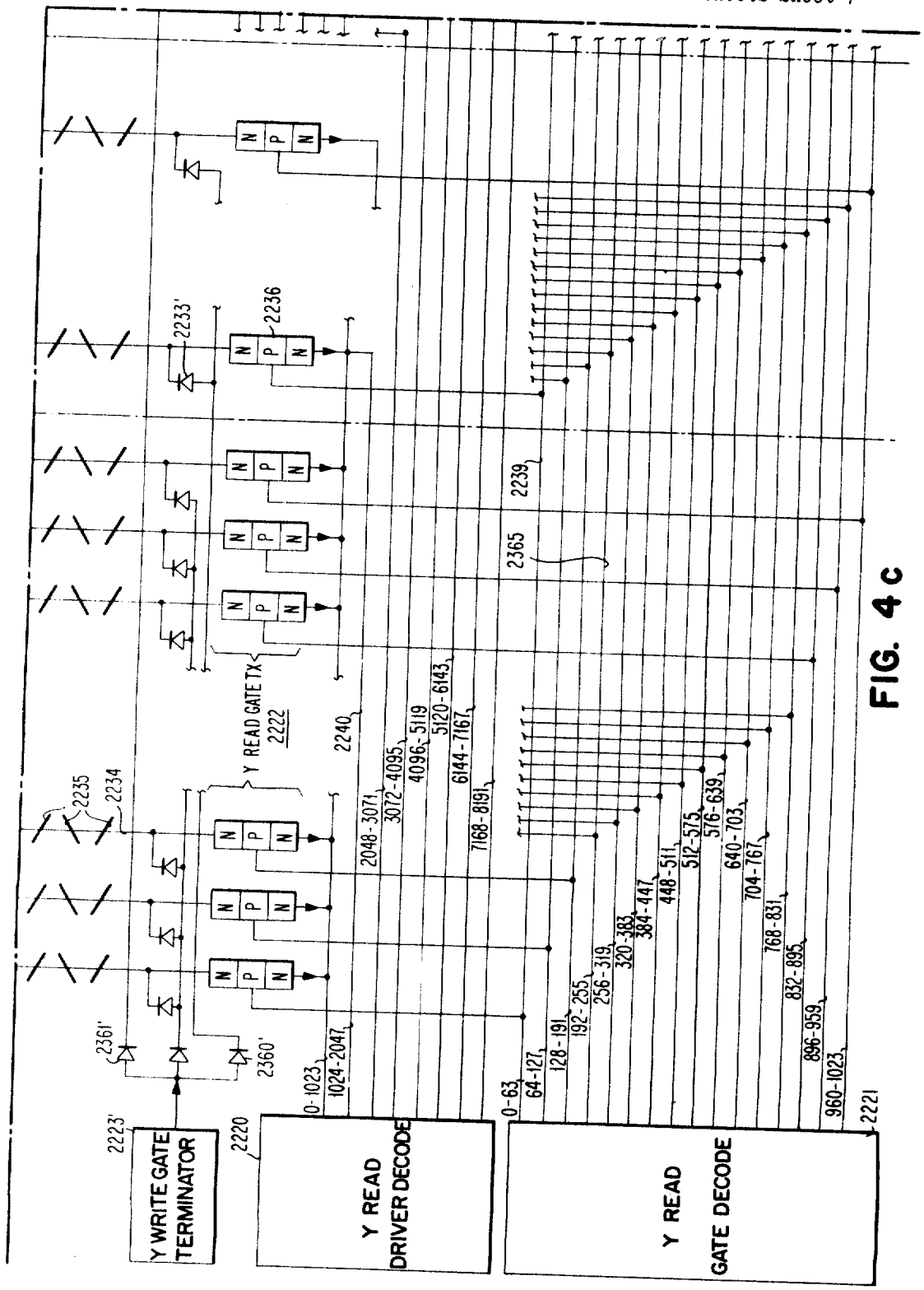

The manner in which Y dimension drive lines are selectively energized in the main storage area 2204, or either of the bump storage areas 2202, 2203, is more fully shown in FIG. 4. As illustrated in FIGS. 4a to d, there are sixteen groups of sixteen Y gate transistors in the main storage area 2204 (eight such groups being for read, and the other eight groups being for write); and eight bump gate transistors in each of the bump storage areas 2202 and 2203 (in each bump area, four gate transistors being for read, and four for write). The Y read gate terminator unit 2223 and write gate terminator unit 2223' act as a current source during read and write operations, respectively, whether the selected address be in the main memory area 2204 or in one of the bump storage areas 2202 or 2203.

Thus, to READ address "1024" in the main storage area 2204, current supplied from Y read gate terminator unit 2223 (FIG. 4a) flows via the appropriate isolating diodes 2360, 2233, drive line 2234 for cores 2235, and the collector and emitter of the particular Y read gate transistor 2236 (FIG. 4c) to line 2240 and thence to the current sink provided by the Y read driver decode unit 2220 associated with the "1024–2047" address group. Meanwhile, the particular labeled transistor 2236 will have been turned on by a signal of positive polarity delivered to its base via the line 2239 from the appropriate Y read gate decode unit 2221 associated with the first Y drive line passing through addresses "0–63." Note that address "1024" is selected and defined by "1024" in the driver decode group and "0" from the "0–63" gate decode group. Hence, the particular transistor labeled 2236 in FIG. 4 is the only Y read gate transistor that will now be on because it has the only positive base signal. Note also that this transistor 2236 will provide a half-select Y current through the specific Y drive line 2234 that threads the 64 cores 2235 of each of the nine planes of the main memory stack.

Meanwhile, similar decode circuitry (not shown in detail) for the X drive lines will provide the half-select current in the appropriate one of 64 X drive lines. The core address "1024" defined at the intersection of these selected X and Y drive lines will thus be selected by the coincident half-select X and Y drive currents.

Conversely, to WRITE in main storage area address "1024," current is supplied from Y write gate terminator unit 2223' via diodes 2360', 2233' and drive line 2234 for cores 2235 to the collector of the particular Y write gate transistor labeled 2236' in FIG. 4. Since address "1024" is within the second group "1024–2047" of eight Y write driver decode units 2220' and within Y write gate decode group "0–63," a positive signal will be supplied via line 2239' to the base of Y write gate transistor labeled 2236' and turn it on. This will permit current to flow through line 2234 threading the cores 2235 and via the collector and emitter of transistor 2236' and line 2240', to the sink provided by the "1024–2047" group of Y write driver decode circuits 2220'.

To READ a particular bump address (such as "212" in the CPU bump storage area 2202), current is supplied from Y read gate terminator unit 2223 (FIG. 4a) via diodes 2361, 2362 and through the particular drive line labeled 2363 to the collector of a corresponding NPN-type transistor 2364 which meanwhile is turned on by supply of current to its base via a line 2365 from the appropriate "192–255" portion of the Y read gate decode unit 2221. The address is identified as bump "212" within the CPU bump storage area 2202 (rather than "212" plus "256" or "468" within the UCW bump storage area 2203) by the presence of an up-level CPU bump signal which, when ANDed at 2228 (see FIG. 1) with the Use Bump up-level signal, provides an up-level signal in line 2229.

To WRITE in bump address "212," current is supplied from Y write gate terminator unit 2223' (FIG. 4c) via a diode 2361' and a unique diode 2362' and the corresponding core drive line 2363 to the collector of a unique NPN-type transistor 2364', which meanwhile is turned on by supply of current to its base via line 2365' from the appropriate "192–255" group of the Y write gate decode unit 2221'.

Note that all drive lines (like 2234, 2363) passing through the cores are individually driven with a diode (like 2233, 2362) and a gate transistor at the end of such line. However, these diodes are driven in groups of sixteen by additional diodes (like 2360 or 2361) to reduce the capacitance seen by any one drive line.

As illustrated in FIGS. 1 and 6, there are nine inhibit drivers 2205, one for each core plane of the stack. Each driver 2205 drives a respective sense-inhibit line SAZ that is threaded through all cores of the corresponding plane. Each SAZ line extends generally parallel to the X drive lines, but with some "jogs," such as heretofore proposed for noise reduction. To prevent saturation of the differential-type sense amplifiers 2206, each SAZ line comprises two legs (like 2245, 2245a) that pass through respective strings of cores. These legs are commoned to ground, as shown in FIG. 6, so that an inhibit pulse from a driver 2205 will present common mode voltages to the sense amplifiers; and thus the sense amplifiers will remain essentially unaffected because the difference between the voltages will be substantially zero.

During reading, if a "1" is stored at a selected main or bump area address, coincident half-select X and Y (or bump) drive currents will induce a voltage in the selected core and hence in the SAZ line. The voltage signal in line SAZ is ANDed at 2246 with a clock strobe pulse (see FIG. 5) supplied to line 2247 to provide a signal at the proper time to the respective sense amplifier 2206 (FIGS. 1, 6). These signals are suitably dot OR'd (by means not shown) and amplified and delivered to a respective one of nine data lines, designated generally 2257 leading to a Selector Channel (not shown); and branches 2210 of said data lines lead to a gate for a general-purpose status register (not shown). Thus, during read, all cores at the selected address in the nine planes will be set to "0" state, if not already at "0" state.

Depending on whether compute time must be allowed, there may or may not be a delay before a Write Call signal is received from the CPU via line 347 and initiates a write cycle. During a write cycle, currents are passed through these X and Y drive lines of the selected address in directions opposite during read cycle and by conditioning the decode circuitry in the manner above explained. Thus, all these cores will be set to the "1" state provided a down-level signal is provided in each of the nine lines 2208 (FIGS. 1 and 6) from general-purpose status registers (not shown) in the CPU and selector channel.

To "inhibit" the setting of the cores in a selected one or more of the nine planes at the selected address to the "1" state (i.e., to store a "0" therein), an up-level signal is provided in the particular lines 2208 going to the respective selected planes. This up-level signal in any 2208 line, when ANDed at 2248 (FIG. 6) with the up-level signal provided at "inhibit time" in a line 2249 by a clock pulse (see FIG. 5), provides a pulse to activate a corresponding inhibit driver 2205. Each such driver 2205 sends current through the SAZ line of the respective selected plane in a direction to offset or neutralize the X drive current through the corresponding core and thus prevent coincident half-selection of said core in that plane.

Thus, during read, the selected core acts as the voltage source, and the sense amplifier 2206 constitutes the load. However, during write, the inhibit driver constitutes the voltage source, and the cores constitute the load.

If preferred, more than one common sense-inhibit line SAZ may be provided for each core plane of the stack. On the other hand, separate sense windings and inhibit windings may be used without departing from the scope and spirit of the invention. To facilitate understanding of the invention, the main storage area has been illustrated as being of 8K capacity; however, it is to be understood that the main storage area may be of larger capacity (e.g., 16K, 32K or 64K) by storing address selection control data in bit positions "2," "1" and "0" of M register 197, respectively.

FIG. 7 illustrates another application of the present invention. Assume that additional main area storage is desired (without any additional bump area storage) to provide additional main area addresses 8192 through 16,383. Assume further that selection of an address in this 8 to 16K main storage area is controlled by the "2" bit position of M register 197 (FIG. 1); i.e., if the M"2" signal is down, the desired address is within the 0 to 8K area, whereas if the M"2" signal is up, the desired address is within the 8 to 16K storage area.

As illustrated in FIG. 7, if bump area 2202 or 2203 is to be addressed, an up-level signal will be provided in the CPU bump line or UCW bump line, respectively (see FIG. 1). This up-level signal will be inverted by a positive OR invert gate 100 and provide down-level signals to branches of a line 101 connected to two negative OR invert gates 102, 103. Also, the "2" bit position of M register 197 is connected via branches of a line 104 to the OR gates 102, 103. Hence, if a down-level signal is present either in line 101 or in line 104, up-level signals will be be provided in lines 105 and 106. An inverter 107 will invert the up-level signal in line 105 and provide a down-level signal in a line 108. Thus, positive AND invert gates 109 and 110 cannot be satisfied so long as either bump storage area 2202 or 2203 is being addressed.

Meanwhile, the up-level signal provided in line 106 will permit positive AND invert gates 111 and 112 to be satisfied when up-level signals are provided in a line 113 (comparable to line 2231 in FIG. 2) at "phase read" time and in a line 114 at "phase write" time, respectively.

More specifically, when the AND invert gate 111 is satisfied at "phase read" time, a down-level signal will be provided in a line 115 and inverted by a negative OR invert gate 116 to provide an up-level signal to turn on a corresponding gate terminator 117 (comparable to terminator 223 in FIG. 2). This gate terminator provides current for reading addresses in the selected bump storage area (as well as in the 0 to 8K main storage area), in the manner already explained in connection with the description of FIGS. 1 to 6.

Later, at "phase write" time, when AND invert gate 112 is satisfied, a down-level signal will be provided in a line 118 and inverted by a negative OR invert gate 119 to provide an up-level signal to turn on a corresponding gate terminator 120. This gate terminator provides current for writing in the selected bump area address (as well as in the 0 to 8K main storage area), in the manner also already explained above.

It is to be noted that the output from AND invert gate 109 constitutes one input to negative OR invert gate 119; and the output from AND invert gate 110 constitutes one input to negative OR invert gate 116. As above noted, these AND gates 109, 110 cannot be satisfied when a bump area address is to be selected and an up-level signal is thus provided in the CPU or UCW bump line. Conversely, if down-level signals are present in both the CPU and UCW bump lines, the level of M"2" bit signal will exclusively determine whether an address is to be selected in the 0 to 8K or 8 to 16K main storage area. Thus, gate terminator 117 will provide current for writing any address within the 8 to 16K main storage area. Similarly, gate terminator 120 will provide current for reading any address in the 8 to 16K main storage area.

It will thus be seen, from the foregoing, that preselection of an address within either bump area 2202 or 2203 and the consequent up-level signal provided in the CPU bump line or UCW bump line will automatically condition the address selection control apparatus to override or nullify whatever data may then be present in the M"2" bit position (as well as the M"7" and M"6" bit positions, in the manner already explained in connection with FIGS. 1 to 6). Nullification of data in the M"2" bit position will positively prevent activation of the gate terminator circuits that control addressing within the 8 to 16K main storage area, and permit activation only of the gate terminator circuits that control addresses within the 0 to 8K main storage area and bump storage area.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for selectively addressing a selectable data-containing address in one or the other of two separate and distinct data storage areas having different numbers of respective address-decoding drive lines, comprising:

address register means having bits of data for controlling address selection, means independent of said bits for preselecting which of the areas is to be addressed, means including means responsive to the preselecting means and an output corresponding to the data in the address register means for energizing a corresponding unique one of the drive lines in the preselected area, and means controlled by the preselecting means and operative, upon preselection of the one area having the fewer number of drive lines, to prevent drive line energization in said one area from being influenced by any invalid combinations of data in said address register means.

2. In combination, one data storage area having a certain number of address-decoding drive lines coupled to respective strings of data-containing address elements, another data storage area different from said one area and having a lesser number of address-decoding drive lines coupled to respective other strings of address elements, address register means having a predetermined number of data-containing binary bit positions, decode means for decoding the data in said predetermined bit positions into a unique one of up to said certain number of outputs, means independent of said address register means for preselecting which of the areas is to be addressed, means including means responsive to the preselecting means and the unique decoded output to energize a corresponding one of the drive lines in the preselected area, and means within said decode means responsive to preselection of said other area to condition said decode means to invalidate data from all bit positions beyond those required to select a unique one of the outputs necessary to select a corresponding one of said lesser number of drive lines.

3. In a data processing system, the combination of two matrix arrays of square hysteresis loop ferrite cores, one array having M parallel strings of cores in one address dimension and the other array having a lesser number L strings in the same dimension, M plus L drive lines each coupled to a respective string of cores, one gate transistor per drive line, one gate terminator connected via respective unidirectional devices to the collector of each gate transistor and serving as a common current source for all drive lines of both arrays, one driver decode circuit connected to the emitter of each gate transistor to serve as an individual current sink for the corresponding drive line when the transistor is conducting, an address register having a predetermined number of bit positions containing data sufficient to provide no more than M possible outputs, means for preselecting the array in which the drive lines are to be selected, and gate decode means for decoding the data in said predetermined bit positions to provide an output signal to the base of a corresponding unique one of the gate transistors in the preselected array to render such transistor conductive for energizing the corresponding drive line, said gate decode means being conditioned by preselection of said other array to disregard data from all address register positions beyond those required to provide a unique one of L output signals necessary to select a corresponding one of L drive lines.

4. In a data processing system, the combination of two matrix arrays of square hysteresis loop ferrite cores, one array having M parallel strings of cores in one address dimension and the other array having a lesser number L strings in the same dimension, M plus L drive lines each coupled to a respective string of cores, one gate transistor per drive line, one gate terminator connected via respective unidirectional devices to the collector of each gate transistor and serving as a common current source for all drive lines of both arrays, a separate driver decode circuit connected to the emitter of each gate transistor to serve as an individual current sink for the corresponding drive line when the transistor is conducting, an address register having a predetermined number of bit positions containing data sufficient to provide no more than M possible outputs, means for preselecting the array in which the drive lines are to be selected, and gate decode means for decoding the data in said predetermined bit positions to provide an output signal to the base of a corresponding unique one of the gate transistors in the preselected array to render such transistor conductive for energizing the corresponding drive line, said preselecting means being effective upon preselection of said other array to provide an input signal to said gate decode means to so modify operation of the latter that all bit positions beyond those required to provide a unique one of the L output signals will be rendered ineffective.

5. The combination, with two separate and distinct storage areas having different data-storing address capacities, of address register means having a certain number of bit positions for receiving binary coded data sufficient to identify the address to be selected in either of said storage areas, means for decoding any number of addresses up to the maximum identifiable by said certain number of bit positions and corresponding substantially to the capacity of the larger of said areas, means independent of the address register means and conditionable to render the last-mentioned means effective to decode addresses from either of said areas selectively, and means including said conditionable means effective during decoding of addresses in the smaller capacity storage area to invalidate data from those particular bit positions controlling addresses exceeding the capacity of the smaller storage area, thereby to prevent incorrect addressing as a result of any potentially invalid data in said particular bit positions.

6. In combination, two distinct data storage areas containing respective pluralities of data storage elements, M uniquely energizable drive lines for selectively addressing storage elements in one of said areas, a lesser number L of uniquely energizable drive lines for selectively addressing storage elements in the other of said areas, address register means having data bits decodable to provide M possible output combinations, means for preselecting the storage area to be addressed, a separate transistor for controlling energization of each drive line, and decode means responsive to the preselecting means and to the data in the address register means to render conductive a unique one of the transistors for thereby energizing its corresponding drive line, said decode means being conditioned upon preselection of said other storage area to disregard and render ineffective all data bits beyond those required to energize a unique one of L drive lines, thereby to cause a unique one of $M+L$ drive lines to be energized with only M output combinations of address register bits and at the same time prevent drive line energization in said other storage area from being influenced by invalid data in said address register means.

References Cited by the Examiner

UNITED STATES PATENTS

| | | | |
|---|---|---|---|
| 2,978,175 | 4/1961 | Newman et al. | 340—172.5 |
| 3,008,127 | 11/1961 | Bloch et al. | 340—172.5 |
| 3,020,525 | 2/1962 | Garrison et al. | 340—172.5 |
| 3,054,988 | 9/1962 | Edwards et al. | 340—172.5 |
| 3,061,192 | 10/1962 | Terzian | 340—172.5 |
| 3,068,452 | 12/1962 | Sarrafian | 340—174 |
| 3,069,658 | 12/1962 | Kramskoy | 340—172.5 |
| 3,120,606 | 2/1964 | Eckert et al. | 340—172.5 |
| 3,157,779 | 11/1964 | Cochrane | 340—174 |
| 3,163,859 | 12/1964 | Stowe | 340—347 |
| 3,200,380 | 8/1965 | MacDonald et al. | 340—172.5 |
| 3,222,647 | 12/1965 | Strachey | 340—172.5 |
| 3,223,982 | 12/1965 | Sacerdoti et al. | 340—172.5 |

ROBERT C. BAILEY, *Primary Examiner.*

J. P. VANDENBURG, *Assistant Examiner.*